US011143574B2

(12) United States Patent
Suzuki

(10) Patent No.: US 11,143,574 B2
(45) Date of Patent: Oct. 12, 2021

(54) SCREENING APPARATUS FOR OPTICAL FIBER AND SCREENING METHOD FOR OPTICAL FIBER

(71) Applicant: FURUKAWA ELECTRIC CO., LTD., Tokyo (JP)

(72) Inventor: Takashi Suzuki, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 611 days.

(21) Appl. No.: 16/129,970

(22) Filed: Sep. 13, 2018

(65) Prior Publication Data

US 2019/0010013 A1    Jan. 10, 2019

Related U.S. Application Data

(63) Continuation of application No. PCT/JP2017/010911, filed on Mar. 17, 2017.

(30) Foreign Application Priority Data

Mar. 18, 2016    (JP) .............................. JP2016-055908

(51) Int. Cl.
*G01M 11/08*    (2006.01)
*G01M 11/00*    (2006.01)
(Continued)

(52) U.S. Cl.
CPC ........... *G01M 11/088* (2013.01); *B65H 63/00* (2013.01); *B65H 63/024* (2013.01); *C03B 37/12* (2013.01);
(Continued)

(58) Field of Classification Search
CPC ....... G01M 11/088; G01M 11/00; G02B 6/02; G02B 6/4458; B65H 63/00; B65H 63/024; B65H 2701/32; G01N 3/00; C03B 37/12
See application file for complete search history.

(56) References Cited

U.S. PATENT DOCUMENTS

| 5,322,228 A | 6/1994 | Nagayama et al. |
| 8,689,636 B2 * | 4/2014 | Bednarczyk ......... G01M 11/088 73/800 |

(Continued)

FOREIGN PATENT DOCUMENTS

| JP | 5-193976 | 8/1993 |
| JP | 6-336368 | 12/1994 |

(Continued)

OTHER PUBLICATIONS

Extended European Search Report dated Oct. 18, 2019 in Patent Application No. 17766843.1, 5 pages.

(Continued)

*Primary Examiner* — John Bedtelyon
(74) *Attorney, Agent, or Firm* — Oblon, McClelland, Maier & Neustadt, L.L.P.

(57) ABSTRACT

Provided is a screening apparatus or the like of an optical fiber that can suppress or prevent occurrence of a fiber-strike on the side of a feeding bobbin regardless of the weight of the feeding bobbin. An embodiment has a feeding bobbin 12 that feeds out an optical fiber 10; a screening unit 16 that applies a tension to the optical fiber 10 fed out from the feeding bobbin 12; a first capstan 14 that feeds the optical fiber 10 into the screening unit 16; a winding bobbin 20 that winds the optical fiber 10 to which the tension is applied by the screening unit 16; and a control unit 70 that, when disconnection of the optical fiber 10 occurs due to the tension applied by the screening unit 16, controls the feeding (Continued)

bobbin 12 and the first capstan 14 so as to stop rotation of the feeding bobbin 12 and rotation of the first capstan 14 and sets a deceleration rate of the first capstan 14 in accordance with a deceleration rate of the feeding bobbin 12.

10 Claims, 8 Drawing Sheets

(51) Int. Cl.
  *G02B 6/02* (2006.01)
  *B65H 63/00* (2006.01)
  *G01N 3/00* (2006.01)
  *G02B 6/44* (2006.01)
  *C03B 37/12* (2006.01)
  *B65H 63/024* (2006.01)

(52) U.S. Cl.
  CPC .............. *G01M 11/00* (2013.01); *G01N 3/00* (2013.01); *G02B 6/02* (2013.01); *G02B 6/4458* (2013.01); *B65H 2701/32* (2013.01)

(56) References Cited

U.S. PATENT DOCUMENTS

| | | | |
|---|---|---|---|
| 9,611,124 B2* | 4/2017 | Yamada | B65H 63/036 |
| 10,921,213 B2* | 2/2021 | Suzuki | H05F 3/04 |
| 2020/0299178 A1* | 9/2020 | Arai | G01M 11/00 |

FOREIGN PATENT DOCUMENTS

| | | |
|---|---|---|
| JP | 10-114537 | 5/1998 |
| JP | 2000-143093 | 5/2000 |
| JP | 2005-119831 | 5/2005 |
| JP | 2011-251878 A | 12/2011 |
| JP | 2015-137995 A | 7/2015 |

OTHER PUBLICATIONS

International Search Report dated Jun. 20, 2017 in PCT/JP2017/010911, filed on Mar. 17, 2017 ( with English Translation).

Written Opinion dated Jun. 20, 2017 in PCT/JP2017/010911, filed on Mar. 17, 2017.

* cited by examiner

FIG. 7

| ROTATION NUMBER OF FEEDING BOBBIN (rpm) | REMAINING LENGTH OF OPTICAL FIBER (km) | DECELERATION RATE OF FEEDING BOBBIN (mpm/s) |
| --- | --- | --- |
| ~961 | ~19 | ~1900 |
| 961~932 | 19~40 | 1900~1750 |
| 932~904 | 40~64 | 1750~1550 |
| 904~878 | 64~89 | 1550~1400 |
| 878~853 | 89~116 | 1400~1300 |
| 853~830 | 116~143 | 1300~1200 |
| 830~809 | 143~169 | 1200~1100 |
| ... | ... | ... |

SCREENING APPARATUS FOR OPTICAL FIBER AND SCREENING METHOD FOR OPTICAL FIBER

CROSS-REFERENCE TO RELATED APPLICATIONS

This application is a continuation application of International Application No. PCT/JP2017/010911, filed Mar. 17, 2017, which claims the benefit of Japanese Patent Application No. 2016-055908, filed Mar. 18, 2016. The contents of the aforementioned applications are incorporated herein by reference in their entireties.

TECHNICAL FIELD

The present invention relates to a screening apparatus for an optical fiber and a screening method for an optical fiber.

BACKGROUND ART

When an optical fiber has a low strength part where the strength is low due to a flaw or the like, disconnection may occur for the low strength part. Accordingly, a screening test is performed on a drawn optical fiber by applying a predetermined tension to test the tensile strength performance thereof. A screening test may be continuously performed directly on the optical fiber drawn by a manufacturing line by using a screening apparatus directly connected to a manufacturing line of the optical fiber, or may be performed on an optical fiber wound around a bobbin after drawing. With an optical fiber being subjected to such a screening test, the life regarding disconnection of an optical fiber is ensured.

In a screening test of an optical fiber, a low strength part of an optical fiber may fail to withstand the applied tension, and the optical fiber may be broken and disconnected at the low strength part. When an optical fiber is disconnected in such a way, the end of the cut optical fiber may strike a normal optical fiber, and as a result, the normal optical fiber may be damaged. As discussed above, in a screening test, the end of a broken optical fiber striking a normal optical fiber is referred to as "fiber-strike".

A fiber-strike may occur on the side of a feeding bobbin that feeds out an optical fiber to be subjected to a screening test or may occur on the side of a winding bobbin that winds the optical fiber after subjected to the screening test. In the fiber-strike which occurs on the side of a winding bobbin, the end on the side of the winding bobbin of two ends of the cut optical fiber strikes the optical fiber normally wound around the winding bobbin. On the other hand, in the fiber-strike which occurs on the side of a feeding bobbin, the end on the side of the feeding bobbin of two ends of the cut optical fiber strikes the optical fiber normally wound around the feeding bobbin.

In any of the above cases, a fiber-strike causes a problem of damaging a normal optical fiber or causing a normal optical fiber to deteriorate. In particular, in recent years, a traveling speed of an optical fiber in a screening test has been increased, and thus the impact of a fiber-strike has been increased. Thus, occurrence of a fiber-strike results in a high likelihood of an optical fiber being damaged. Further, when a screening test is performed while an optical fiber is caused to continuously travel at a high speed, the traveling distance of the broken end of the optical fiber from the time when disconnection occurs to the time when rotation of the winding bobbin actually stops tends to be longer. A longer traveling distance of the broken end causes a problem of a higher occurrence frequency of fiber-strike. In order to suppress a fiber-strike or the like causing damage of an optical apparatus have been proposed so far (Patent Literatures 1 and 2).

Patent Literature 1 discloses that, in a screening apparatus for an optical fiber, a path line extension part is provided between a screening wheel and a winder. In the configuration disclosed in Patent Literature 1, due to the path line extension part, a traveling path of an optical fiber from the screening wheel to the winder is longer than an optical fiber length wound after the optical fiber is broken and before the winder is stopped by a brake apparatus. Patent Literature 1 discloses that, with such a configuration, a broken end can be stopped within the traveling path when the optical fiber is broken, and a fiber-strike can be avoided.

Further, Patent Literature 2 discloses that, in a screening apparatus for a linear member such as an optical fiber, linear member disconnection detection means is provided, and a brake apparatus is provided to bobbins and wheels of the screening apparatus, such as both bobbins on the feeding side and the winding side. In the configuration disclosed in Patent Literature 2, when disconnection of a linear member is detected by the linear member disconnection detection means, the rotation of the bobbins and the rotation of the wheels are forced to be stopped by the break apparatus. Patent literature 2 discloses that, with the rotation of the bobbin being forced to be stopped in such a way, the end section of the broken linear member is not wound around any wheel and thus no damage is caused on the linear member wound around a feeding bobbin.

CITATION LIST

Patent Literature

Patent Literature 1: Patent Application Laid-Open No. H10-114537
Patent Literature 2: Patent Application Laid-Open No. 2000-143093

SUMMARY OF INVENTION

Technical Problem

In recent years, the length of an optical fiber wound around a single bobbin tends to be longer. Thus, the weight of a bobbin around which an optical fiber is wound tends to increase. Therefore, even with a use of a strong brake, it is difficult to stop the bobbin within a certain time, and occurrence of a fiber-strike may not be suppressed even with a use of the conventional method.

Further, in the configuration disclosed in Patent Literature 1, even if a fiber-strike on an optical fiber wound around a winder can be suppressed, it is difficult to suppress a fiber-strike which occurs on the side of a feeding bobbin around which an optical fiber to be subjected to a screening test is wound. Further, in the configuration disclosed in Patent Literature 2, while the rotation of the bobbin or the like is forced to be stopped by using the brake apparatus, it may be difficult to stop the bobbin or the like within a certain time as described above.

The present invention has been made in view of the above and intends to provide a screening apparatus for an optical fiber and a screening method for an optical fiber that can suppress or prevent occurrence of a fiber-strike on the side of a feeding bobbin regardless of the weight of the feeding bobbin.

Solution to the Problem

According to one aspect of the present invention, provided is a screening apparatus for an optical fiber, the screening apparatus including: a feeding bobbin that feeds out an optical fiber; a tension application unit that applies a tension to the optical fiber fed out from the feeding bobbin; a capstan that feeds the optical fiber fed out from the feeding bobbin into the tension application unit; a winding bobbin that winds the optical fiber to which the tension is applied by the tension application unit; and a control unit that, when disconnection of the optical fiber occurs due to the tension applied by the tension application unit, controls the feeding bobbin and the capstan so as to stop rotation of the feeding bobbin and rotation of the capstan and sets a deceleration rate of the capstan in accordance with a deceleration rate of the feeding bobbin.

According to another aspect of the present invention, provided is a screening method for an optical fiber, the screening method including steps of: feeding out an optical fiber from a feeding bobbin; feeding the optical fiber into a tension application unit by using a capstan; applying a tension to the optical fiber by the tension application unit; winding the optical fiber to which the tension is applied by the tension application unit by using a winding bobbin; and when disconnection of the optical fiber occurs due to the tension applied by the tension application unit, stopping rotation of the feeding bobbin and rotation of the capstan and setting a deceleration rate of the capstan in accordance with a deceleration rate of the feeding bobbin.

Advantageous Effects of Invention

According to the present invention, occurrence of a fiber-strike on the side of a feeding bobbin can be suppressed or prevented regardless of the weight of the feeding bobbin.

BRIEF DESCRIPTION OF DRAWINGS

FIG. 7 is a diagram illustrating an example of a database used for calculating the deceleration rate of the feeding bobbin in the screening method for an optical fiber according to the first embodiment of the present invention.

DESCRIPTION OF EMBODIMENTS

First Embodiment

A screening apparatus for an optical fiber and a screening method for an optical fiber according to a first embodiment of the present invention will be described by using FIG. 1 to FIG. 7.

Figure 1:
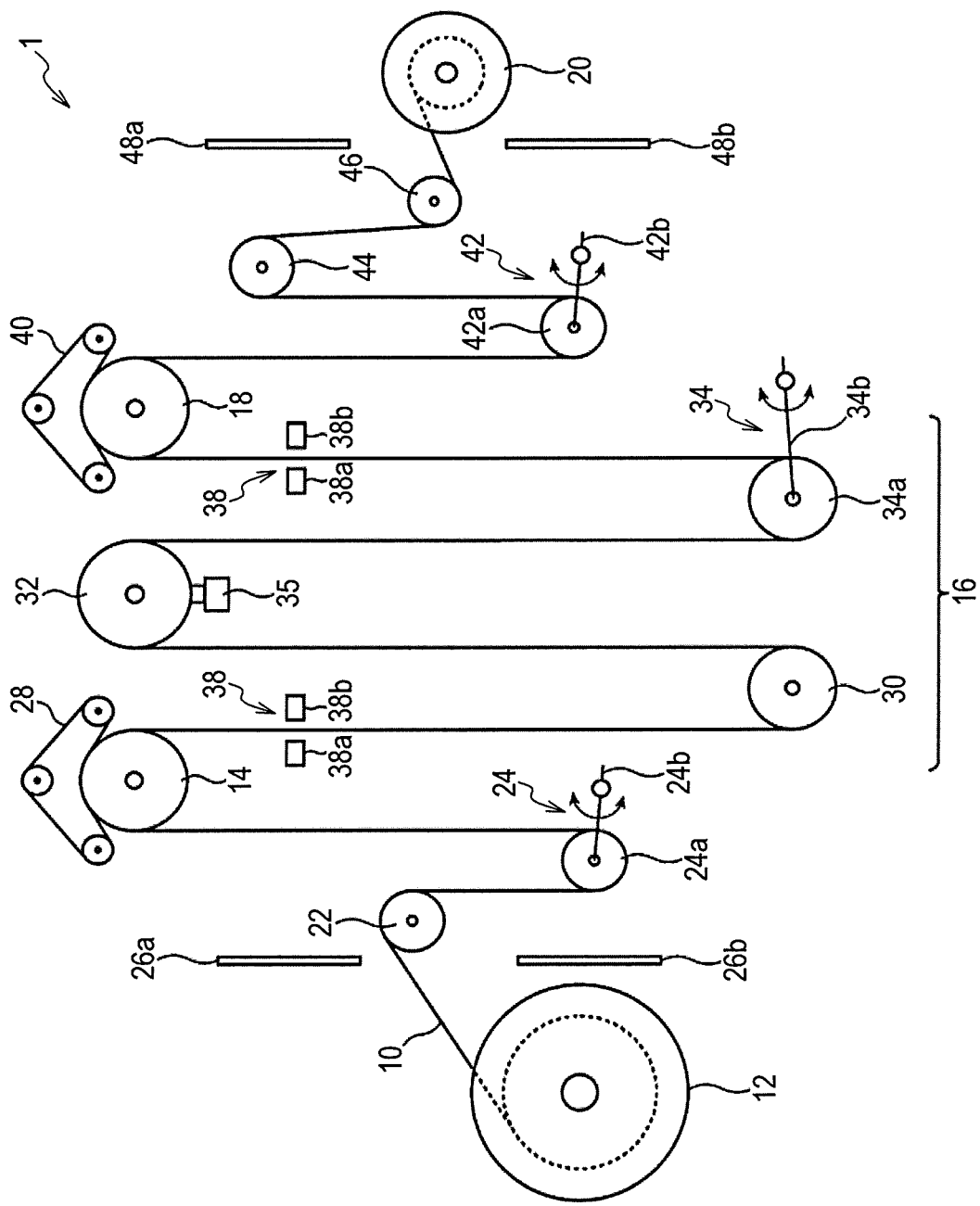
FIG. 1 is a schematic diagram illustrating a screening apparatus for an optical fiber according to a first embodiment of the present invention.
Figure 2:
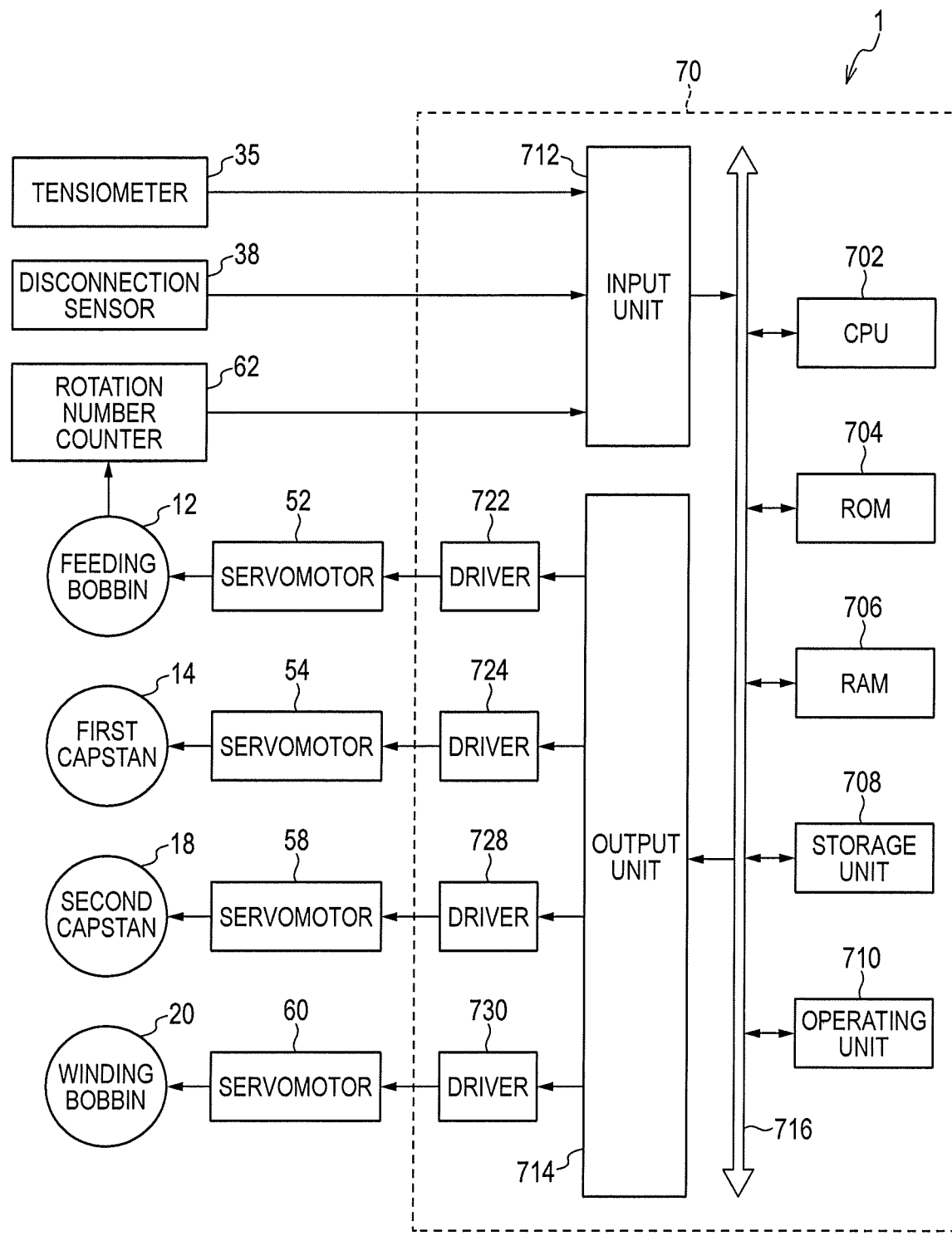
FIG. 2 is a block diagram illustrating the screening apparatus for an optical fiber according to the first embodiment of the present invention.

First, a configuration of the screening apparatus for an optical fiber according to the present embodiment will be described by using FIG. 1 and FIG. 2. FIG. 1 is a schematic diagram illustrating a screening apparatus for an optical fiber according to the present embodiment. FIG. 2 is a block diagram illustrating the screening apparatus for an optical fiber according to the present embodiment.

The screening apparatus for an optical fiber according to the present embodiment is an apparatus that performs a screening test for testing a tensile strength performance of an optical fiber. As illustrated in FIG. 1, a screening apparatus 1 for an optical fiber according to the present embodiment has a feeding bobbin 12, a first capstan 14, a screening unit 16, a second capstan 18, and a winding bobbin 20. The feeding bobbin 12, the first capstan 14, the screening unit 16, the second capstan 18, and the winding bobbin 20 are provided in this order from the upstream side to the downstream side of the screening apparatus 1.

Around the feeding bobbin 12, an optical fiber 10 to be subjected to a screening test is wound. The feeding bobbin is adapted to be rotary-driven by a servomotor 52 (see FIG. 2) in a direction in which the optical fiber 10 is fed out.

In the feeding bobbin 12, a rotation number counter 62 (see FIG. 2) that measures the rotation number (rotation speed) of the feeding bobbin 12 is provided. The rotation number counter 62 measures the rotation number of the feeding bobbin 12 while performing a screening test and outputs a measurement signal in accordance with the measured rotation number.

Between the feeding bobbin 12 and the first capstan 14, a pulley 22 and a pulley 24a are provided in this order from the upstream side to the downstream side of the screening apparatus 1. The pulley 24a is a pulley of a feeding dancer 24. Each of the feeding bobbin 12, the pulley 22, the pulley 24a, and the first capstan 14 has a horizontal rotating shaft. Further, the rotating shafts of the feeding bobbin 12, the pulley 22, the pulley 24a, and the first capstan 14 are in parallel to each other.

The pulley 22 is arranged higher than the feeding bobbin 12. The pulley 24a is arranged lower than the pulley 22. The first capstan 14 is arranged higher than the pulley 24a. Further, the first capstan 14 is arranged higher than the pulley 22. Furthermore, the first capstan 14 is arranged substantially the same height as the second capstan 18. In this way, the feeding bobbin 12, the pulley 22, the pulley 24a, and the first capstan 14 are arranged from the upstream side to the downstream side of the screening apparatus 1 in a zigzag manner in a vertical direction. The optical fiber 10 fed out from the feeding bobbin 12 is wound around and hung on the pulley 22, the pulley 24a, and the first capstan 14 in a zigzag manner in this order.

The feeding dancer 24 has the pulley 24a and a bar-like support member 24b to which the pulley 24a is attached at a tip part in a rotatable manner. The support member 24b has a rotary shaft parallel to the rotating shaft of the pulley 24a at the base thereof and is able to revolve about the rotary shaft. The pulley 24a moves up and down in response to revolution of the support member 24b. In such a way, on the feeding side of the optical fiber 10, the tension applied to the optical fiber 10 is adjusted by the pulley 24a of the feeding dancer 24 moving vertically.

Further, between the feeding bobbin 12 and the pulley 22, a pair of strike-prevention plates 26a and 26b for preventing occurrence of a fiber-strike on the feeding bobbin 12 side are provided. The pair of strike-prevention plates 26a and 26b are arranged so as to be located above and under the optical fiber 10 hung on from the feeding bobbin 12 to the pulley 22, respectively, with respective plate faces facing the screening unit 16 side.

The first capstan 14 provided on the upstream side of the screening unit 16 is for feeding the optical fiber 10, which is fed out from the feeding bobbin 12, to the screening unit 16. The first capstan 14 is adapted to be rotary-driven by a servomotor 54 (see FIG. 2) to feeds the optical fiber 10 from the upstream side to the downstream side of the screening apparatus 1.

A rotatable endless belt 28 is pressed to the first capstan 14. The endless belt 28 is adapted to rotate in an opposite direction to the rotation direction of the first capstan 14 in response to the rotation of the first capstan 14. While being interposed between the first capstan 14 and the endless belt 28, the optical fiber 10 wound around the first capstan 14 is fed out by the rotation of the first capstan 14.

The screening unit 16 functions as a tension application unit that applies a tension to the optical fiber 10 fed out from the feeding bobbin 12. The screening unit has a pulley 30, a pulley 32, and a pulley 34a. The pulley 34a is a pulley of a screening dancer 34. The pulley 30, the pulley 32, and the pulley 34a are provided in this order from the upstream side to the downstream side of the screening apparatus 1. Each of the pulley 30, the pulley 32, and the pulley 34a has a horizontal rotating shaft. Further, the rotating shafts of the pulley 30, the pulley 32, and the pulley 34a are parallel to each other and parallel to the rotating shaft of the first capstan 14.

The pulley 30 is arranged lower than the first capstan 14. The pulley 32 is arranged higher than the pulley 30 and pulley 34a. The pulley 32 is arranged substantially the same height as the first capstan 14 and the second capstan 18 that are arranged at substantially the same height. In this way, the pulley 30, the pulley 32, and the pulley 34a are arranged from the upstream side to the downstream side of the screening apparatus 1 in a zigzag manner in a vertical direction. The optical fiber 10 fed out from the first capstan 14 to the screening unit 16 is wound around and hung on the pulley 30, the pulley 32, and the pulley 34a in a zigzag manner in this order.

The screening dancer 34 has the pulley 34a and a bar-like support member 34b to which the pulley 34a is attached at a tip part in a rotatable manner. The support member 34b has a rotary shaft parallel to the rotating shaft of the pulley 34a at the base thereof and is able to revolve about the rotary shaft. The pulley 34a moves up and down in response to revolution of the support member 34b. In such a way, the screening dancer 34 is adapted to apply a certain tension to the optical fiber 10 by the weight of the pulley 34a moving vertically.

A tensiometer 35 that measures a tension of an optical fiber 10 wound around and hung on the pulley 32 is provided to the pulley 32. As the tensiometer 35, a load cell is used, for example. The tensiometer 35 measures the tension of the optical fiber 10 while performing a screening test and outputs a measurement signal in accordance with the measured tension. The vertical motion of the pulley 34a by the screening dancer 34 described above is controlled so that the tension measured by the tensiometer 35 is constant.

Disconnection sensors 38 that detect occurrence of disconnection of the optical fiber 10 are provided in the screening unit 16. Each of the disconnection sensors 38 is of an optical type, for example, and has a light source unit 38a and a light receiving unit 38b arranged on both sides of the optical fiber 10. The disconnection sensor 38 detects occurrence of disconnection of the optical fiber 10 based on a change in a light receiving amount at the light receiving unit 38b that receives a light emitted from the light source unit 38a. The disconnection sensor 38 outputs a detection signal in response to detecting occurrence of disconnection of the optical fiber 10.

A plurality of disconnection sensors 38 are provided to the screening unit 16. For example, the disconnection sensor 38 is provided near the first capstan 14 between the first capstan 14 and the pulley 30. Further, for example, the disconnection sensor 38 is provided near the second capstan 18 between the pulley 34a of the screening dancer 34 and the second capstan 18.

Note that the disconnection sensor 38 is not limited to the optical type disconnection sensor. As the disconnection sensor 38, other than the optical disconnection sensor, various types of the disconnection sensors such as a contact type disconnection sensor can be used. Further, while FIG. illustrates the case where two disconnection sensors 38 are provided to the screening unit 16, the number of disconnection sensors 38 is not limited thereto. At least one or more disconnection sensors 38 may be provided. Further, the position where the disconnection sensor 38 is provided in the screening unit 16 may be changed as appropriate.

The second capstan 18 is provided on the downstream side of the screening unit 16. The second capstan 18 has a horizontal rotating shaft. Further, the rotating shaft of the second capstan 18 is parallel to the rotating shaft of the first capstan 14. The second capstan 18 is arranged higher than the pulley 34a of the screening unit 16. The optical fiber 10 wound around and hung on the pulley 34a is wound around and hung on and over the second capstan 18.

The second capstan 18 provided on the downstream side of the screening unit 16 is for feeding out the optical fiber 10 to which a tension is applied by the screening unit from the screening unit 16. The second capstan 18 is adapted to be rotary-driven by a servomotor 58 (see FIG. 2) to feeds the optical fiber 10 from the upstream side to the downstream side of the screening apparatus 1.

A rotatable endless belt 40 is pressed to the second capstan 18. The endless belt 40 is adapted to rotate in an opposite direction to the rotation direction of the second capstan 18 in response to the rotation of the second capstan 18. While being interposed between the second capstan 18 and the endless belt 40, the optical fiber 10 wound around and hung on the second capstan 18 is fed out by the rotation of the second capstan 18.

Between the second capstan 18 and the winding bobbin 20, a pulley 42a, a pulley 44, and a pulley 46 are provided in this order from the upstream side to the downstream side of the screening apparatus 1. The pulley 42a is a pulley of a winding dancer 42. Each of the pulley 42a, the pulley 44, the pulley 46, and the winding bobbin 20 has a horizontal rotating shaft. Further, the rotating shaft of the pulley 42a, the pulley 44, the pulley 46, and the winding bobbin 20 are parallel to each other and is parallel to the rotating shaft of the second capstan 18.

The pulley 42a is arranged lower than the second capstan 18. The pulley 44 is arranged higher than the pulley 42a. The pulley 46 is arranged lower than the pulley 44. In this way, the pulley 42a, the pulley 44, and the pulley 46 are arranged from the upstream side to the downstream side of the screening apparatus 1 in a zigzag manner in a vertical direction. The optical fiber 10 fed out from the second capstan 18 is wound around and hung on the pulley 42a, the pulley 44, and the pulley 46 in a zigzag manner in this order. One end of the optical fiber 10 wound around and hung on the pulley 46 is fixed to the winding bobbin 20 so that the optical fiber 10 is wound by the winding bobbin 20.

The winding dancer 42 has the pulley 42a and a bar-like support member 42b to which the pulley 42a is attached at a tip part in a rotatable manner. The support member 42b has a rotary shaft parallel to the rotating shaft of the pulley 42a at the base thereof and is able to revolve about the rotary shaft. The pulley 42a moves up and down in response to revolution of the support member 42b. In such a way, on the winding side of the optical fiber 10, the tension applied to the optical fiber 10 is adjusted by the pulley 42a of the winding dancer 42 moving vertically.

Further, between the pulley 46 and the winding bobbin 20, a pair of strike-prevention plates 48a and 48b for preventing occurrence of a fiber-strike on the winding bobbin 20 side are provided. The pair of strike-prevention plates 48a and 48b are arranged so as to be located above and under the optical fiber 10 hung on from the pulley 46 to the winding bobbin 20, respectively, with respective plate faces facing the screening unit 16 side.

The winding bobbin 20 is for winding the optical fiber 10 to which a tension is applied by the screening unit 16 and which has been subjected to a screening test. The winding bobbin 20 is adapted to be rotary-driven in a direction in which the optical fiber 10 is wound by a servomotor 60 (see FIG. 2).

As illustrated in FIG. 2, the screening apparatus 1 according to the present embodiment has the servomotor 52 that rotary-drives the feeding bobbin 12 and the servomotor that rotary-drives the first capstan 14. Further, the screening apparatus 1 according to the present embodiment has the servomotor 58 that rotary-drives the second capstan and the servomotor 60 that rotary-drives the winding bobbin 20.

Further, the screening apparatus 1 according to the present embodiment has a control unit 70 that controls the entire operation of the screening apparatus 1. The control unit 70 has a central processing unit (CPU) 702, a read only memory (ROM) 704, a random access memory (RAM) 706, a storage unit 708, and an operating unit 710. Further, the screening apparatus 1 according to the present embodiment has an input unit 712 and an output unit 714. The CPU 702, the ROM 704, the RAM 706, the storage unit 708, the operating unit 710, the input unit 712, and the output unit 714 are connected to a common bus 716.

The control unit 70 further has a driver 722 used for driving the servomotor 52, a driver 724 used for driving the servomotor 54, a driver 728 used for driving the servomotor 58, and a driver 730 used for driving the servomotor 60. The drivers 722, 724, 728, and 730 are connected to the output unit 714, respectively. The output unit 714 performs signal processing such as digital-to-analog (D/A) conversion on a control signal output from the CPU 702 and outputs the control signal to the drivers 722, 724, 728, and 730 in a processable manner.

The tensiometer 35 is connected to the input unit 712. Further, the disconnection sensor 38 is connected to the input unit 712. Further, the rotation number counter 62 is connected to the input unit 712. The input unit 712 performs signal processing such as analog-to-digital (A/D) conversion on signals input to the control unit 70 from the tensiometer 35, the disconnection sensor 38, and the rotation number counter 62 and enables processing of these signals in the control unit 70.

The CPU 702 executes a control program and controls the entire operation of the screening apparatus 1. The ROM 704 stores a control program executed by the CPU 702. The RAM 706 is used as a working area when the CPU 702 executes the control program. The storage unit 708 stores various data to which the CPU 702 refers when executing the control program. Further, an operator can perform various settings on a screening test or can input an instruction of execution of the screening test via the operating unit 710.

The CPU 702 performs control for rotary-driving the feeding bobbin 12, the first capstan 14, the second capstan 18, and the winding bobbin 20 when performing a screening test.

Specifically, the CPU 702 outputs a rotation instruction signal, which is a control signal for instructing rotary drive of the servomotor 52, to the driver 722 via the output unit 714. The driver 722 outputs, to the servomotor 52, a drive signal that rotary-drives the servomotor 52 based on the rotation instruction signal input from the CPU 702. In response to the drive signal being input from the driver 722 to the servomotor 52, the servomotor 52 rotates. In response to rotation of the servomotor 52, the feeding bobbin 12 rotates, and the optical fiber 10 is fed out from the feeding bobbin 12 around which the optical fiber 10 has been wound.

Further, the CPU 702 outputs a rotation instruction signal, which is a control signal for instructing rotary drive of the servomotor 54, to the driver 724 via the output unit 714. The driver 724 outputs, to the servomotor 54, a drive signal that rotary-drives the servomotor 54 based on the rotation instruction signal input from the CPU 702. In response to the drive signal being input from the driver 724 to the servomotor 54, the servomotor 54 rotates. In response to rotation of the servomotor 54, the first capstan rotates, and the optical fiber 10 fed out from the feeding bobbin 12 is fed to the screening unit 16.

Further, the CPU 702 outputs a rotation instruction signal, which is a control signal for instructing rotary drive of the servomotor 58, to the driver 728 via the output unit 714. The driver 728 outputs, to the servomotor 58, a drive signal that rotary-drives the servomotor 58 based on the rotation instruction signal input from the CPU 702. In response to the drive signal being input from the driver 728 to the servomotor 58, the servomotor 58 rotates. In response to rotation of the servomotor 58, the second capstan 18 rotates, and the optical fiber 10 to which a tension is applied by the screening unit 16 is fed out from the screening unit 16.

Further, the CPU 702 outputs a rotation instruction signal, which is a control signal for instructing rotary drive of the servomotor 60, to the driver 730 via the output unit 714. The driver 730 outputs, to the servomotor 60, a drive signal that rotary-drives the servomotor 60 based on the rotation instruction signal input from the CPU 702. In response to the drive signal being input from the driver 730 to the servomotor 60, the servomotor 60 rotates. In response to rotation of the servomotor 60, the winding bobbin 20 rotates, and the optical fiber 10 to which a tension is applied by the screening unit 16 is wound around by the winding bobbin 20.

As discussed above, in a screening test, each of the feeding bobbin 12, the first capstan 14, the second capstan 18, and the winding bobbin 20 rotates. Thereby, the optical fiber 10 fed out from the feeding bobbin 12 is transported at a constant drawing speed on a path through the first capstan 14, the screening unit 16, and the second capstan 18 in this order. Meanwhile, a constant tension is applied to the optical fiber 10 by the screening dancer 34 in the screening unit 16.

The CPU 702 controls the operation of the screening dancer 34 so that the tension measured by the tensiometer 35 is constant based on a measurement signal input from the tensiometer 35 via the input unit 712.

When there is a low strength part in the optical fiber 10 to which a constant tension is applied in the screening unit 16, the optical fiber 10 is broken and disconnected at the low strength part due to the tension applied by the screening unit 16. The low strength part of the optical fiber 10 is due to a flaw, a defect, or the like of the optical fiber 10.

The occurrence of disconnection of the optical fiber 10 is detected by the disconnection sensor 38. In response to the detection of the occurrence of disconnection of the optical fiber 10, the disconnection sensor 38 outputs a detection signal. The detection signal output from the disconnection sensor 38 is input to the CPU 702 via the input unit 712.

Once the detection signal is input from the disconnection sensor 38, the CPU 702 controls the feeding bobbin 12, the first capstan 14, the second capstan 18, and the winding bobbin 20 to stop each rotation thereof. In such a way, upon the detection of the occurrence of disconnection of the optical fiber 10, the CPU 702 performs control to stop transporting the optical fiber 10.

Specifically, the CPU 702 outputs a stop instruction signal, which is a control signal for instructing stop of the rotary drive of the servomotor 52, to the driver 722 via the output unit 714. The driver 722 outputs, to the servomotor 52, a stop signal that stops the rotary drive of the servomotor 52 based on the stop instruction signal input from the CPU 702. In response to the stop signal being input from the driver 722 to the servomotor 52, stop of rotary drive of the servomotor 52 is instructed.

Even after the stop of rotary drive of the servomotor 52 is instructed, inertial force works on the servomotor 52 and the feeding bobbin 12 due to the weight of the optical fiber 10 wound around the feeding bobbin 12 and the weight of the feeding bobbin 12 itself. Thus, the servomotor 52 and the feeding bobbin 12 stop the rotation thereof after rotating with momentum while slowing down at a predetermined deceleration rate. As used herein, a deceleration rate of the feeding bobbin 12 is a ratio of reduction in speed per unit time of a drawing speed of the optical fiber 10 fed out from the feeding bobbin 12. For example, when the deceleration rate of the feeding bobbin 12 is S [mpm/s], this means that the drawing speed of the optical fiber 10 fed out from the feeding bobbin 12 is decelerated at a ratio of S meter/minute (mpm) per second.

The deceleration rate of the feeding bobbin 12 depends on the weight of the feeding bobbin 12 when stop of rotary drive of the servomotor 52 is instructed. Note that the weight of the feeding bobbin 12 as used herein is a weight including the weight of the optical fiber 10 left wound around the feeding bobbin 12 when stop of rotary drive of the servomotor 52 is instructed. That is, the deceleration rate of the feeding bobbin 12 depends on the length of the optical fiber 10 left wound around the feeding bobbin 12 when stop of rotary drive of the servomotor 52 is instructed, that is, the remaining length of the optical fiber 10. For example, when the optical fiber 10 is fed at a constant drawing speed in a screening test, the deceleration rate of the feeding bobbin 12 is smaller for a longer remaining length of the optical fiber 10 and is larger for a shorter remaining length of the optical fiber 10.

Note that the weight of the feeding bobbin 12 described above can be converted to the remaining length of the optical fiber 10 remaining around the feeding bobbin 12 by using the weight of the empty feeding bobbin 12 around which no optical fiber 10 is wound and the weight per unit length of the optical fiber 10. Further, the length of the optical fiber 10 can be converted into weight unit by using the weight per unit length of the optical fiber 10. Thus, instead of the remaining length of the optical fiber 10, the weight of the optical fiber 10 left wound around the feeding bobbin 12 when stop of rotary drive of the servomotor 52 is instructed, that is, the remaining weight of the optical fiber 10 may be used as a reference.

The remaining length of the optical fiber 10 having a correlation with a deceleration rate of the feeding bobbin as described above has a correlation with a rotation number of the feeding bobbin 12. That is, when the optical fiber 10 is fed at a constant drawing speed in a screening test, the remaining length of the optical fiber 10 is longer for a smaller rotation number of the feeding bobbin 12 and is shorter for a greater rotation number of the feeding bobbin 12.

In the present embodiment, during a screening test being performed, the rotation number counter 62 provided in the feeding bobbin 12 measures the rotation number of the feeding bobbin 12. A measurement signal output from the rotation number counter 62 is input to the CPU 702 via the input unit 712. The CPU 702 acquires the rotation number of the feeding bobbin 12 when stop of rotary drive of the servomotor 52 is instructed based on the measurement signal input from the rotation number counter 62. Furthermore, the CPU 702 refers to a database stored in the storage unit 708 to sequentially calculates the remaining length of the optical fiber 10 and the deceleration rate of the feeding bobbin 12 based on the acquired rotation number of the feeding bobbin 12 and the length of the optical fiber which was initially wound around the feeding bobbin 12.

A correlation of the rotation number of the feeding bobbin 12 and the remaining length of the optical fiber 10 is acquired in advance and stored in the storage unit 708 as a database. The CPU 702 can refer to the database to calculate the remaining length of the optical fiber 10 based on the rotation number of the feeding bobbin 12 when stop of rotary drive of the servomotor 52 is instructed.

Further, a correlation of the remaining length of the optical fiber 10 and the deceleration rate of the feeding bobbin 12 is acquired in advance and stored in the storage unit 708 as a database. The CPU 702 can refer to the database to further calculate the deceleration rate of the feeding bobbin 12 based on the calculated remaining length of the optical fiber 10.

In this way, the CPU 702 calculates the deceleration rate of the feeding bobbin 12 in controlling the feeding bobbin 12 so as to stop rotation of the feeding bobbin 12.

Further, the CPU 702 outputs a stop instruction signal, which is a control signal for instructing stop of the rotary drive of the servomotor 54, to the driver 724 via the output unit 714. The driver 724 outputs, to the servomotor 54, a stop signal that stops the rotary drive of the servomotor 54 based on the stop instruction signal input from the CPU 702. In response to the stop signal being input from the driver 724 to the servomotor 54, stop of rotary drive of the servomotor 54 is instructed.

The CPU 702 outputs the stop instruction signal as described above and outputs a deceleration rate setting instruction signal to the driver 724. The deceleration rate setting instruction signal is a control signal that instructs setting of a deceleration rate of the first capstan 14 in accordance with the deceleration rate of the feeding bobbin 12. As used herein, the deceleration rate of the first capstan 14 is a ratio of reduction in speed per unit time of the drawing speed of the optical fiber 10 fed by the first capstan 14. For example, when the deceleration rate of the first capstan 14 is C [mpm/s], this means that the drawing speed of the optical fiber 10 fed out by the first capstan 14 is decelerated at a ratio of C meter/minute (mpm) per second.

Based on a deceleration rate setting instruction signal input from the CPU 702, the driver 724 outputs, to the servomotor 54, a deceleration rate setting signal that sets the deceleration rate of the first capstan 14 in accordance with the deceleration rate of the feeding bobbin 12. In response to the deceleration rate setting signal being input to the servomotor 54 from the driver 724, the rotation of the servomotor 54 is decelerated at a constant ratio and then stops. Thereby, the first capstan 14 stops rotation while decelerating at a deceleration rate in accordance with the deceleration rate of the feeding bobbin 12.

In this way, the CPU 702 sets the deceleration rate of the first capstan 14 in accordance with the deceleration rate of the feeding bobbin 12 in controlling the first capstan 14 so as to stop the rotation of the first capstan 14.

As discussed above, in the screening apparatus 1 according to the present embodiment, when disconnection of the optical fiber 10 occurs, the control unit 70 controls the feeding bobbin 12 and the first capstan 14 so as to stop the rotation of the feeding bobbin 12 and the rotation of the first capstan 14. At this time, the control unit 70 sets the deceleration rate of the first capstan 14 in accordance with the deceleration rate of the feeding bobbin 12. Details of setting of the deceleration rate of the first capstan 14 will be described below.

As described above, the deceleration rate of the feeding bobbin 12 has a correlation with the remaining length of the optical fiber 10 wound around the feeding bobbin 12. Thus, also in the time taken for the feeding bobbin 12 to stop, it has a correlation with the remaining length of the optical fiber 10. Note that the time taken for the feeding bobbin 12 to stop is a time period from the time when stop of rotary drive of the corresponding servomotor 52 is instructed to the time when the rotation of the feeding bobbin 12 stops. Specifically, the longer the remaining length of the optical fiber 10 is, the longer the time taken for the feeding bobbin 12 to stop is.

A case is here considered where the deceleration rate of the first capstan 14 is not set in the control in which transportation of the optical fiber 10 is stopped by detection of occurrence of disconnection of the optical fiber 10. In this case, the first capstan 14 stops with substantially a constant deceleration rate regardless of the deceleration rate of the feeding bobbin 12. Thus, the time taken for the first capstan 14 to stop is also substantially a constant time regardless of the time taken for the feeding bobbin 12 to stop. Note that the time taken for the first capstan 14 to stop is a time period from the time when stop of rotary drive of the corresponding servomotor 54 is instructed to the time when the rotation of the first capstan 14 stops.

Figure 3:
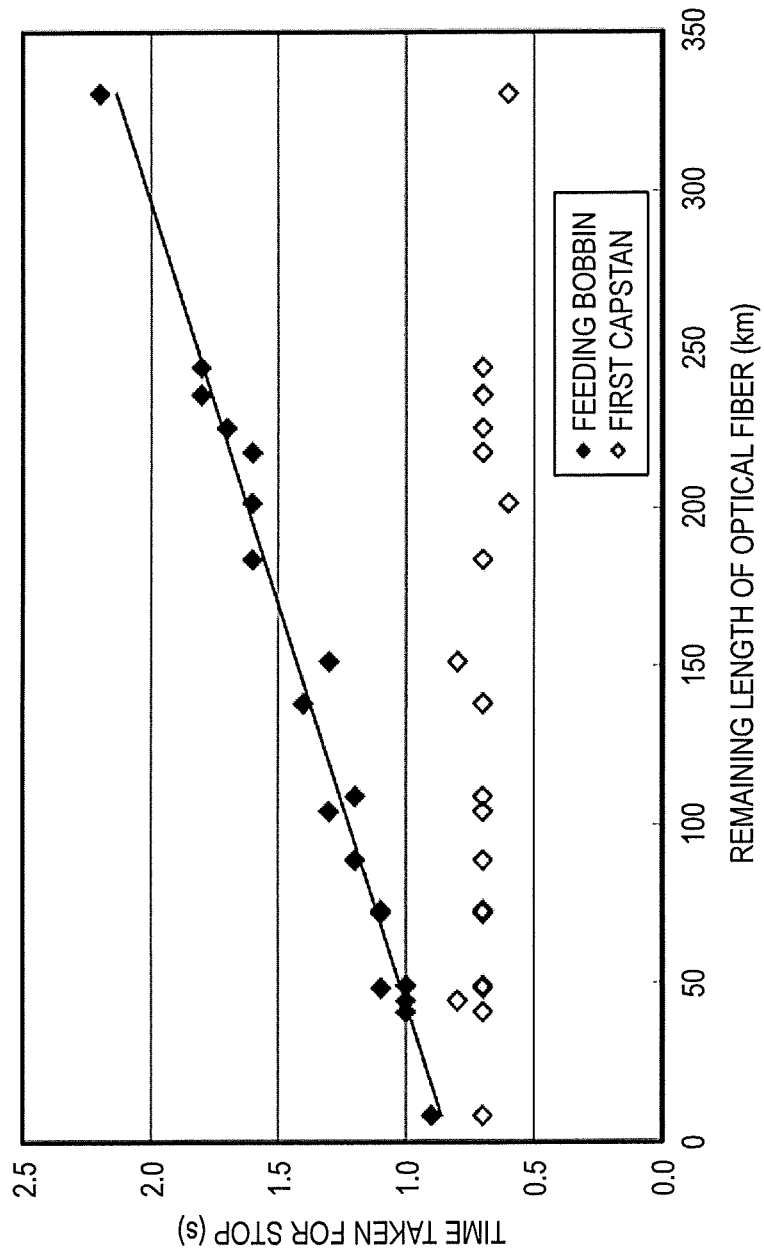
FIG. 3 is a graph illustrating an example of a relationship between a remaining length of an optical fiber and time taken for a feeding bobbin to stop and time taken for a first capstan to stop when the deceleration rate of the first capstan is not set.

FIG. 3 is a graph illustrating an example of a relationship between a remaining length of an optical fiber 10 and the time taken for the feeding bobbin 12 to stop and the time taken for the first capstan 14 to stop when a deceleration rate of the first capstan 14 is not set. In the graph illustrated in FIG. 3, the horizontal axis represents the remaining length of the optical fiber 10 wound around the feeding bobbin 12, and the vertical axis represents the time taken for the feeding bobbin 12 to stop and the time taken for the first capstan 14 to stop, respectively.

As is clear from FIG. 3, the time taken for the feeding bobbin 12 to stop increases according to increase of the remaining length of the optical fiber 10. On the other hand, the time taken for the first capstan 14 to stop is substantially constant regardless of the remaining length of the optical fiber 10.

As illustrated in FIG. 3, when the time taken for the first capstan 14 to stop is substantially constant, some remaining length of the optical fiber 10 may cause a large difference between the time taken for the feeding bobbin 12 to stop and the time taken for the first capstan 14 to stop. Such a large difference between the times taken for stop causes large slack in the optical fiber 10 between the feeding bobbin 12 and the first capstan 14. As a result, a fiber-strike to the optical fiber 10 wound around the feeding bobbin 12 may occur, or winding of the optical fiber 10 to the feeding bobbin 12 or the pulley 22 or 24a, or the like may occur. When winding of the optical fiber 10 occurs, it takes time to remove the wound optical fiber 10, and thus the working efficiency is reduced.

As discussed above, when the deceleration rate of the first capstan 14 is not set, a fiber-strike or winding of the optical fiber 10 is likely to occur, which is difficult to be suppressed. Although it is considered to set the deceleration rate of the first capstan 14 to the average value of the deceleration rate of the feeding bobbin 12, the time taken for the feeding bobbin 12 to stop will be long when the remaining length of the optical fiber 10 is long. Thus, also in this case, a fiber-strike or winding of the optical fiber 10 is likely to occur as described above.

Further, when the remaining length of the optical fiber 10 is short, since the time taken for the feeding bobbin 12 to stop becomes shorter, a tension is applied to the optical fiber 10 on the feeding side. Thus, in this case, a fiber-strike is likely to occur and, in addition, interlocking of the optical fiber 10 into the feeding bobbin 12 may occur.

In contrast, in the screening apparatus 1 according to the present embodiment, in the control for stopping transportation of the optical fiber 10 by using detection of occurrence of disconnection of the optical fiber 10, the deceleration rate of the first capstan 14 is set by the control unit 70 in accordance with the deceleration rate of the feeding bobbin 12. That is, the time taken for the first capstan 14 to stop is set in accordance with the time taken for the feeding bobbin 12 to stop. Thereby, the difference between the time taken for the feeding bobbin 12 to stop and the time taken for the first capstan 14 to stop can be set within an appropriate range regardless of the remaining length of the optical fiber 10, that is, the weight of the feeding bobbin 12.

Figure 4:
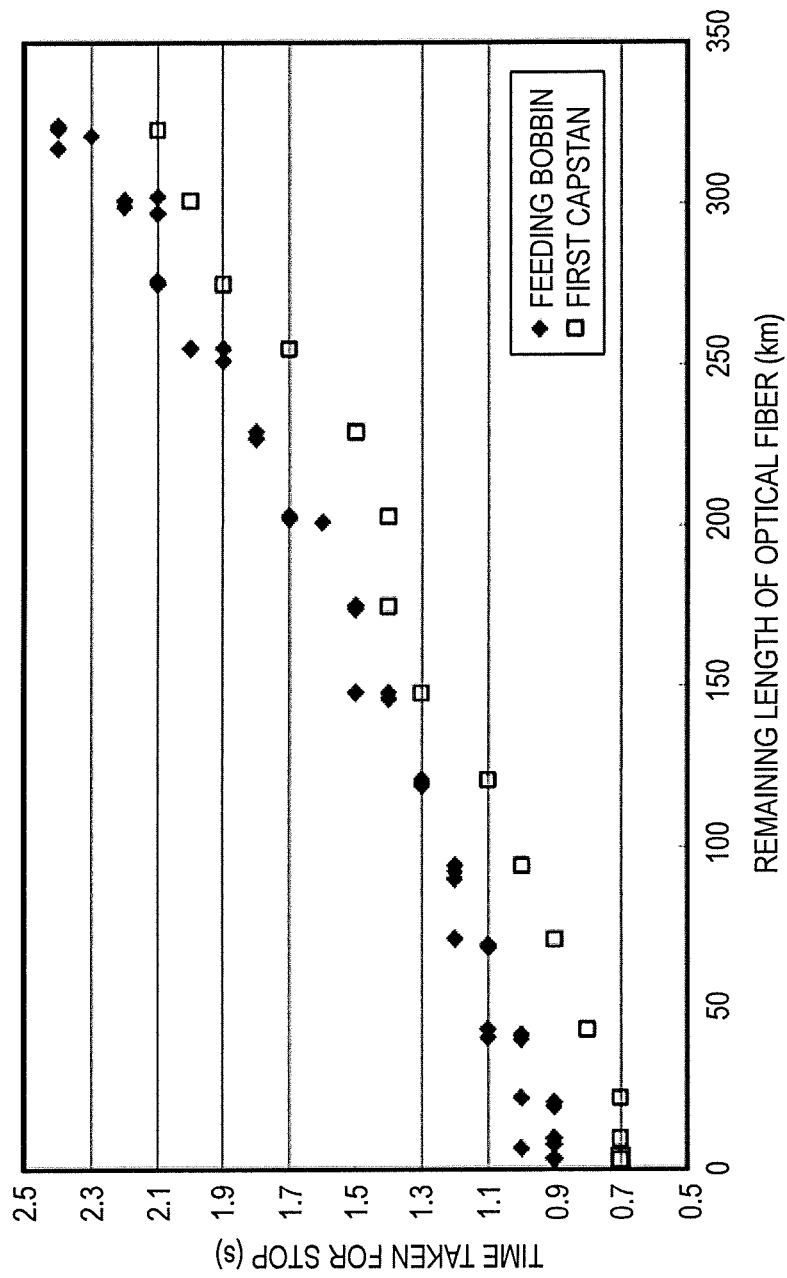
FIG. 4 is a graph illustrating an example of a relationship between a remaining length of an optical fiber and time taken for a feeding bobbin to stop and time taken for a first capstan to stop when the deceleration rate of the first capstan is set in accordance with the deceleration rate of the feeding bobbin.

FIG. 4 is a graph illustrating an example of a relationship between a remaining length of an optical fiber 10 and the time taken for the feeding bobbin 12 to stop and the time taken for the first capstan 14 to stop when a deceleration rate of the first capstan 14 is set in accordance with the deceleration rate of the feeding bobbin 12. In the graph illustrated in FIG. 4, the horizontal axis represents the remaining length of the optical fiber 10 wound around the feeding bobbin 12, and the vertical axis represents the time taken for the feeding bobbin 12 to stop and the time taken for the first capstan 14 to stop, respectively.

As illustrated in FIG. 4, in the present embodiment, the deceleration rate of the first capstan 14 is set in accordance with the deceleration rate of the feeding bobbin 12, and thereby the time taken for the first capstan 14 to stop is set to the time in accordance with the time taken for the feeding bobbin 12 to stop.

As discussed above, in the screening apparatus 1 according to the present embodiment, the deceleration rate of the first capstan 14 is set in accordance with the deceleration rate of the feeding bobbin 12, and thereby the difference between the time taken for the feeding bobbin 12 to stop and the time taken for the first capstan 14 to stop is set within an appropriate range. Thereby, in the screening apparatus 1 according to the present embodiment, it is possible to suppress or prevent a fiber-strike on the optical fiber 10 wound around the feeding bobbin 12 from occurring on the feeding bobbin 12 side. Further, it is possible to suppress or prevent wiring of the optical fiber 10 on the feeding bobbin 12 or the pulley 22 or 24*a* from occurring. Furthermore, by suppressing or preventing an excessive tension from being applied to the optical fiber 10 between the feeding bobbin 12 and the first capstan 14, it is possible to suppress or prevent interlocking of the optical fiber 10 into the optical fiber wound around the feeding bobbin 12.

A preferred range of the deceleration rate of the first capstan 14 set in the screening apparatus 1 according to the present embodiment will be described below by using FIG. 5.

Figure 5:
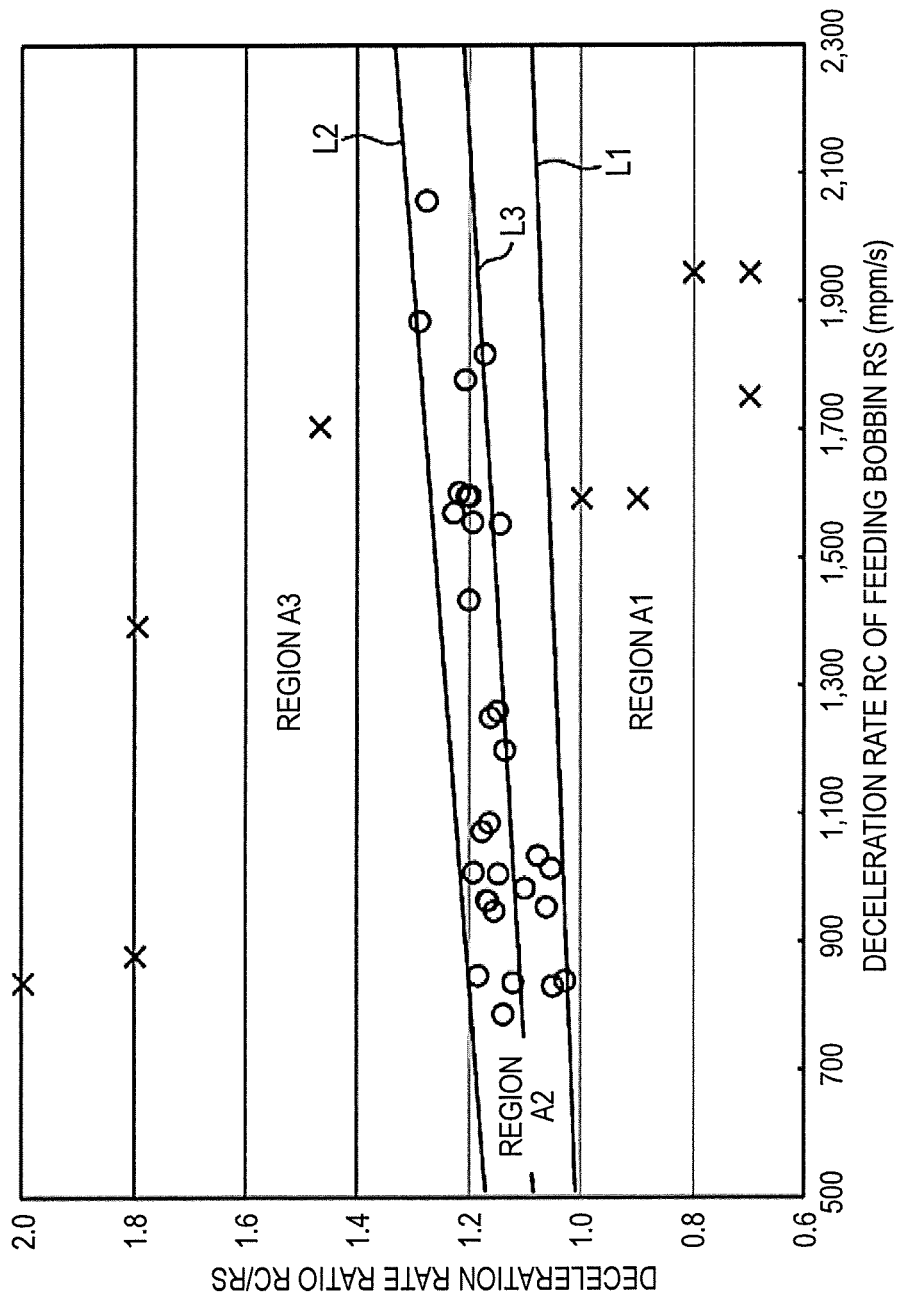
FIG. 5 is a graph illustrating an example of a relationship between the deceleration rate of the feeding bobbin and a deceleration rate ratio that is a ratio of a deceleration rate of the first capstan to the deceleration ratio of the feeding bobbin.
Figure 6:
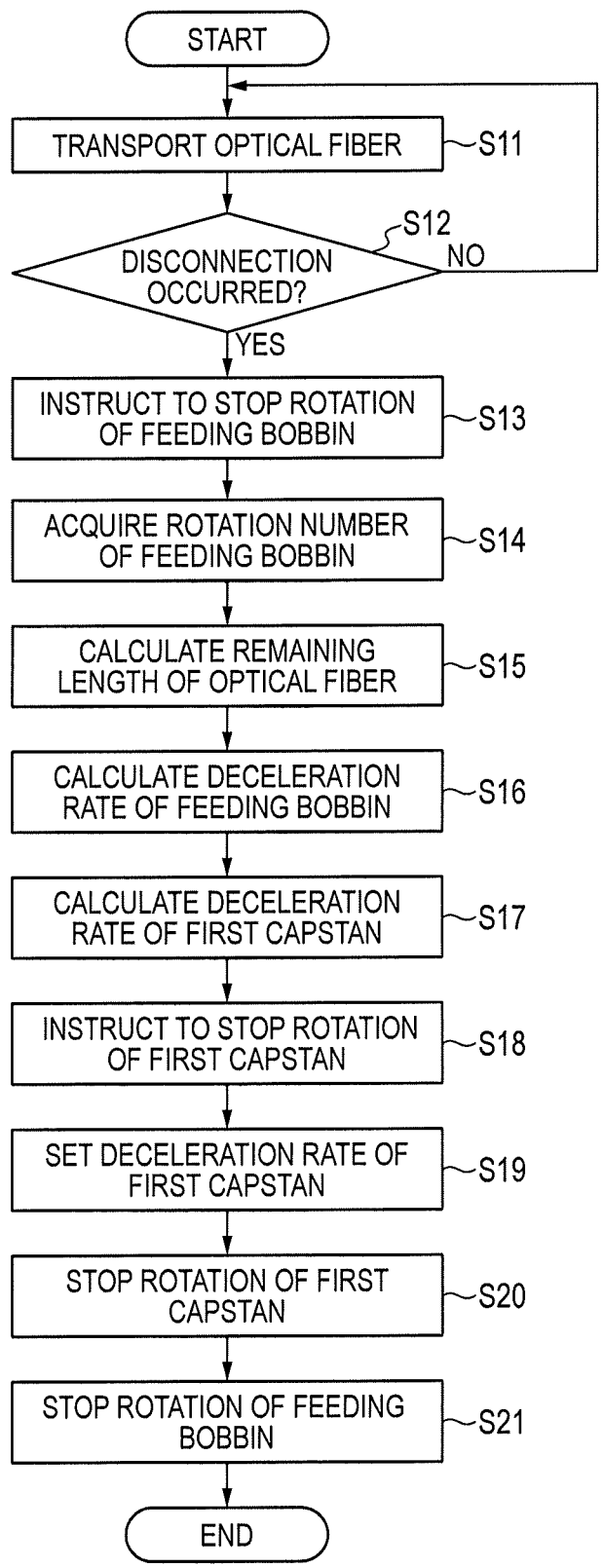
FIG. 6 is a flowchart illustrating a screening method for an optical fiber according to the first embodiment of the present invention.

With respect to a deceleration rate Rs of the feeding bobbin 12 and a deceleration rate Rc of the first capstan 14, FIG. 5 is a graph illustrating an example of a relationship between the deceleration rate Rs and a deceleration rate ratio Rc/Rs that is a ratio of the deceleration rate Rc to the deceleration ratio Rs. In the graph illustrating FIG. 5, the horizontal axis represents the deceleration rate Rs of the feeding bobbin 12, and the vertical axis represents the deceleration rate ratio Rc/Rs.

In the screening apparatus 1 according to the present embodiment, the deceleration rate ratio Rc/Rs with respect to the deceleration rate Rs can be used as a parameter to be controlled to set the deceleration rate Rc of the first capstan 14. Note that the reason why the deceleration rate ratio Rc/Rs with respect to the deceleration rate Rs is used as a parameter will be described below.

Since the actual screening apparatuses have different sizes and weights of components, the appropriate range of the deceleration rate Rc of the first capstan 14 is different depending on the apparatus. The individual difference of such screening apparatuses can be cancelled by standardizing the deceleration rate Rc of the first capstan 14 by using the deceleration rate Rs of the feeding bobbin 12. Accordingly, with the deceleration rate ratio Rc/Rs with respect to the deceleration rate Rs being defined as a control parameter, the individual difference among screening apparatuses can be cancelled, and the appropriate range described below can be defined for screening apparatuses having different sizes or different weights of components.

FIG. 5 illustrates a line L1 that approximates plots of measuring points by a least square method when interlocking of the optical fiber 10 occurs in the feeding bobbin 12 due to a low deceleration rate of the first capstan 14. Note that plots of measuring points approximated by the line L1 are not illustrated in FIG. 5. The line L1 is expressed by the following equation:

$$y = 4.1 \times 10^{-5} x + 1.002 \qquad \text{L1:}$$

where the deceleration rate Rs is x and the deceleration rate ratio Rc/Rs is y.

Further, FIG. 5 illustrates a line L2 that approximates plots of measuring points by a least square method when a fiber-strike on the feeding bobbin 12 side or winding of the optical fiber 10 to the pulley 22 or 24*a* occurs due to a high deceleration rate of the first capstan 14. Note that plots of measuring points approximated by the line L2 are not illustrated in FIG. 5. The line L2 is expressed by the following equation.

$$y = 8.3 \times 10^{-5} x + 1.141 \qquad \text{L2:}$$

Note that, in order to appropriately stop the rotation of the feeding bobbin 12 and the rotation of the first capstan 14, some degree of slack is necessary in the optical fiber 10 between the feeding bobbin 12 and the first capstan 14. Thus, the rotation of the first capstan 14 needs to be stopped in a shorter time for a higher deceleration rate of the feeding bobbin 12, that is, for a shorter remaining length of the optical fiber 10. Therefore, the lines L1 and L2 described above are upward to the right.

The region in the graph illustrated in FIG. 5 is divided into three regions A1, A2, and A3 by the lines L1 and L2 described above.

The region A1 is a region expressed by the following equation.

$$y \leq 4.1 \times 10^{-5} x + 1.002 \qquad \text{A1:}$$

The region A2 is a region expressed by the following equation.

$$4.1 \times 10^{-5} x + 1.002 < y < 8.3 \times 10^{-5} x + 1.141 \qquad \text{A2:}$$

The region A3 is a region expressed by the following equation.

$$y \geq 8.3 \times 10^{-5} x + 1.141 \qquad \text{A3:}$$

First, in the region A1, since the deceleration rate of the first capstan 14 is relatively low, the pulley 24*a* of the feeding dancer 24 rises, and as a result, interlocking of the optical fiber 10 is likely to occur in the feeding bobbin 12. Interlocking of the optical fiber 10 leads to a reduction in the strength of a part where the optical fiber interlocks. Furthermore, deeper interlocking leads to disconnection of the optical fiber 10. When the interlocking optical fiber 10 is disconnected, the end of the cut optical fiber 10 is buried in the optical fiber 10 wound around the feeding bobbin 12, and it is difficult to feed the end of the optical fiber 10. In order to feed the end of the optical fiber 10, it is necessary to cut the optical fiber 10 wound around the feeding bobbin 12. In terms of suppression of occurrence of such interlocking of the optical fiber 10, the deceleration rate Rc of the first capstan 14 included in the region A1 is not preferable. Interlocking of the optical fiber 10 occurred at every measuring point indicated by an x-mark included in the region A1.

On the other hand, in the region A3, since the deceleration rate of the first capstan 14 is relatively high, a fiber-strike on the feeding bobbin 12 side occurs, and winding of the optical fiber 10 to the pulley 22 or 24*a* occurs. In the region A3, occurrence rate of fiber-strike on the feeding bobbin 12 is 35% or higher. Note that the occurrence rate of fiber-strike is a rate of the number of times of occurrence of fiber-strike on the feeding bobbin 12 to the number of times of disconnection of the optical fiber 10. In terms of suppression of occurrence of such a fiber-strike or winding of the optical fiber 10, the deceleration rate Rc of the first capstan 14 included in the region A3 is not preferable. A fiber-strike occurred on the feeding bobbin 12 side at every measuring point indicated by an x-mark included in the region A3.

As set forth, it is preferable that the deceleration rate Rc of the first capstan 14 be included in the region A2. At any of the measuring points indicated by a circle included in the region A2, neither interlocking of the optical fiber 10 nor fiber-strike on the feeding bobbin 12 side occurred. In the screening apparatus 1 according to the present embodiment, the CPU 702 of the control unit 70 can set the deceleration rate Rc such that the deceleration rate Rc is included in the region A2 in the control of stopping the rotation of the first capstan 14 by using detection of occurrence of disconnection of the optical fiber 10. That is, the CPU 702 can set the deceleration rate Rc of the first capstan 14 so that the deceleration rate Rs and the deceleration rate ratio Rc/Rs satisfies Equation (1) below:

$$4.1 \times 10^{-5} x + 1.002 < y < 8.3 \times 10^{-5} x + 1.141 \quad (1)$$

where x is the deceleration rate Rs, and y is the deceleration rate ratio Rc/Rs, as described above.

By setting the deceleration rate Rc in such a way, it is possible to suppress or prevent interlocking of the optical fiber 10 from occurring and suppress or prevent a fiber-strike on the feeding bobbin 12 or wiring of the optical fiber 10 on the pulley 22 or 24a from occurring. With respect to a fiber-strike, by setting the deceleration rate Rc as described above, it is possible to reduce the occurrence rate of fiber-strike on the feeding bobbin 12 to be less than 35%.

FIG. 5 illustrates the actual measuring points where the deceleration rate Rc is set. It has been confirmed that, with the deceleration rate Rc being set such that the deceleration rate Rs and the deceleration rate ratio Rc/Rs satisfy Equation (1) described above, the occurrence rate of fiber-strike is suppressed to be less than 35%.

Further, FIG. 5 illustrates a line L3. The line L3 is a line resulted by using a least square method to approximate intermediate points between the measuring points when the deceleration rate Rc providing the line L1 is low and the measuring points when the deceleration rate Rc providing the line L2 is high. The line L3 is expressed by the following equation.

$$y = 6.2 \times 10^{-5} x + 1.072$$

By setting the deceleration rate Rc within ±10% of the value obtained by the line L3, it is possible to further reduce the occurrence rate of fiber-strike on the feeding bobbin 12. That is, it is possible to further reduce the occurrence rate of fiber-strike on the feeding bobbin 12 by setting the deceleration rate Rc of the first capstan 14 so that the deceleration rate Rs and the deceleration rate ratio Rc/Rs satisfy Equation (2) below:

$$0.9 \times (6.2 \times 10^{-5} x + 1.072) \leq y \leq 1.1 \times (6.2 \times 10^{-5} x + 1.072) \quad (2)$$

where x is the deceleration rate Rs, and y is the deceleration rate ratio Rc/Rs in the same manner as in Equation (1) described above.

The CPU 702 can set the deceleration rate Rc of the first capstan 14 so that the deceleration rate Rs and the deceleration rate ratio Rc/Rs satisfy Equation (2) described above. By setting the deceleration rate Rc so that the deceleration rate Rs and the deceleration rate ratio Rc/Rs satisfy Equation (2) described above, it is possible to reduce the occurrence ratio of fiber-strike on the feeding bobbin 12 to be 10% or less.

As discussed above, according to the present embodiment, the deceleration rate Rc of the first capstan 14 is set by the control unit 70 in accordance with the deceleration rate Rs of the feeding bobbin 12. Thus, according to the present embodiment, occurrence of a fiber-strike on the feeding bobbin 12 side can be suppressed or prevented regardless of the weight of the feeding bobbin 12.

Note that, with respect to the second capstan 18 and the winding bobbin 20, control of stopping rotation is performed as illustrated below.

The CPU 702 outputs a stop instruction signal, which is a control signal to instruct stop of the rotary drive of the servomotor 58, to the drive 728 via the output unit 714. The driver 728 outputs, to the servomotor 58, a stop signal to stop rotary drive of servomotor 58 based on the stop instruction signal input from the CPU 702. In response to the stop signal being input from the driver 728 to the servomotor 58, stop of the rotary drive of the servomotor 58 is instructed. In this way, the rotation of the servomotor 58 stops, and the rotation of the second capstan 18 stops.

Further, the CPU 702 outputs a stop instruction signal, which is a control signal to instruct stop of the rotary drive of the servomotor 60, to the drive 730 via the output unit 714. The driver 730 outputs, to the servomotor 60, a stop signal to stop rotary drive of servomotor 60 based on the stop instruction signal input from the CPU 702. In response to the stop signal being input from the driver 730 to the servomotor 60, stop of the rotary drive of the servomotor 60 is instructed. In this way, the rotation of the servomotor 60 stops, and the rotation of the winding bobbin 20 stops.

The control condition such as timing of control of stopping rotation of the second capstan 18 and the winding bobbin 20 can be set as appropriate.

Next, a screening method for the optical fiber according to the present embodiment using the screening apparatus 1 illustrated in FIG. 1 and FIG. 2 described above will be further described by using FIG. 6 and FIG. 7. FIG. is a flowchart illustrating a screening method for an optical fiber according to the present embodiment. FIG. 7 is a diagram illustrating an example of a database used for calculating a deceleration rate of the feeding bobbin.

A correlation between the rotation number of the feeding bobbin 12 and the remaining length of the optical fiber 10 is acquired in advance and stored as a database in the storage unit 708 of the control unit 70 before a screening test is performed. Further, a correlation between the remaining length of the optical fiber 10 and the deceleration rate of the feeding bobbin 12 is acquired in advance and stored as a database in the storage unit 708. These databases are referred by the CPU 702 in calculating the deceleration rate Rs of the feeding bobbin 12. Further, these databases are prepared for respective feeding bobbins having different bobbin widths and different winding numbers of the optical fiber 10.

For example, once an execution instruction of a screening test is input to the control unit 70 via the operating unit 710 by an operator, the CPU 702 performing a control program controls the screening apparatus 1 to start the screening test.

First, the CPU 702 outputs rotation instruction signals to the drivers 722, 724, 728, and 730 via the output unit 714, respectively. The drivers 722, 724, 728, and 730 to which the rotation instruction signals are input from the CPU 702 output drive signals to the servomotors 52, 54, 58, and 60, respectively. The servomotors 52, 54, 58, and 60 rotate in accordance with drive signals input from the drivers 722, 724, 728, and 730, respectively. Thereby, the feeding bobbin 12, the first capstan 14, the second capstan 18, and the winding bobbin 20 rotate, respectively.

In this way, the feeding bobbin 12, the first capstan 14, the second capstan 18, and the winding bobbin 20 are rotary-driven by the control unit 70. Thereby, the optical fiber 10 wound around the feeding bobbin 12 is fed out from the feeding bobbin 12. Further, the optical fiber 10 fed out from the feeding bobbin 12 is transported at a constant drawing speed on a path through the first capstan 14, the screening unit 16, and the second capstan 18 in this order, and then wound by the winding bobbin 20 (step S11). The optical fiber 10 fed out from the feeding bobbin 12 is fed into the screening unit 16 by the first capstan 14. The optical fiber 10 is fed out from the screening unit 16 by the second capstan 18.

While the optical fiber 10 is being transported as described above, a constant tension is applied to the optical fiber 10 by the screening dancer 34 in the screening unit 16. The tension applied by the screening dancer 34 is applied to the optical fiber 10 between the first capstan 14 and the pulley 30, between the pulley 30 and the pulley 32, and between the pulley 32 and the pulley 34a. Further, the operation of the screening dancer 34 is controlled by the control unit 70 so that the tension measured by the tensiometer 35 becomes constant. The optical fiber 10 to which a tension is applied by the screening unit 16 is wound around by the winding bobbin 20.

Further, while the optical fiber 10 is being transported, presence or absence of occurrence of disconnection of the optical fiber 10 is monitored by the disconnection sensor 38 (step S12).

While occurrence of disconnection of the optical fiber 10 is not detected by the disconnection sensor 38 (step S12, NO), transportation of the optical fiber 10 continues.

In response to detecting occurrence of disconnection of the optical fiber 10 (step S12, YES), the disconnection sensor 38 outputs a detection signal. The detection signal output from the disconnection sensor 38 is input to the CPU 702 via the input unit 712.

Once the detection signal is input from the disconnection sensor 38, the CPU 702 controls the feeding bobbin 12, the first capstan 14, the second capstan 18, and the winding bobbin 20 so as to stop each rotation thereof. The control of stopping the rotation of the feeding bobbin 12 and the first capstan 14 will be described below.

The CPU 702 outputs a stop instruction signal to the driver 722 via the output unit 714. The driver 722 to which the stop instruction signal is input from the CPU 702 outputs a stop signal to the servomotor 52. Stop of the rotary drive of the servomotor 52 is instructed by the stop signal input from the driver 722 (step S13).

Even with the instruction of stopping rotary drive of the servomotor 52, inertial force works on the feeding bobbin 12. Thus, the servomotor 52 and the feeding bobbin do not stop the rotation at the same time as the stop instruction, and stop the rotation after inertial rotation while slowing down at a predetermined deceleration rate.

A measurement signal output from the rotation number counter 62 that measures the rotation number of the feeding bobbin 12 is input to the CPU 702 via the input unit 712. Based on the measurement signal input from the rotation number counter 62, the CPU 702 acquires the rotation number of the feeding bobbin 12 when the stop of rotary drive of the servomotor 52 is instructed (step S14).

Next, the CPU 702 reads, from the storage unit 708, and refers to a database on the correlation between the rotation number of the feeding bobbin 12 and the remaining length of the optical fiber 10. Thereby, the CPU 702 calculates the remaining length of the optical fiber 10 based on the rotation number of the feeding bobbin 12 when the stop of rotary drive of the servomotor 52 is instructed (step S15).

Next, the CPU 702 reads, from the storage unit 708, and refers to a database on the correlation between the remaining length of the optical fiber 10 and the deceleration rate of the feeding bobbin 12. Thereby, the CPU 702 calculates the deceleration rate of the feeding bobbin 12 based on the calculated remaining length of the optical fiber 10 (step S16).

FIG. 7 is a diagram illustrating an example of a database used for calculating a deceleration rate of the feeding bobbin 12 as described above. A database 80 illustrated in FIG. 7 is acquired in advance in accordance with the type of the feeding bobbin 12, the type and length of the optical fiber 10 wound around the feeding bobbin 12, or the like and is stored in the storage unit 708 before a screening test.

In the database 80, the range of the remaining length of the optical fiber 10 corresponding to the range of the rotation number of the feeding bobbin 12 is recorded. Furthermore, in the database 80, the range of the deceleration rate of the feeding bobbin 12 corresponding to the range of the remaining length of the optical fiber 10 is recorded. By referring to such the database 80, the CPU 702 can calculate the remaining length of the optical fiber 10 in step S15 and calculate the deceleration rate of the feeding bobbin 12 in step S16. Note that the database used for calculating the deceleration rate of the feeding bobbin 12 is not limited to that like the database 80 illustrated in FIG. 7, but various forms of databases can be used.

Note that a database that directly associates the rotation number of the feeding bobbin 12 with the deceleration rate of the feeding bobbin 12 may be prepared. By referring to such a database, the CPU 702 can directly calculate the deceleration rate of the feeding bobbin 12 from the rotation number of the feeding bobbin 12.

CPU 702 calculates the deceleration rate of the first capstan 14 based on the deceleration rate of the feeding bobbin 12 calculated in step S16 (step S17). Specifically, with respect to the deceleration rate Rs of the feeding bobbin 12 and the deceleration rate Rc of the first capstan 14, the CPU 702 sets the deceleration rate Rc of the first capstan 14 so that the deceleration rate Rs and the deceleration rate ratio Rc/Rs satisfy Equation (1) described above. Further, the CPU 702 can also set the deceleration rate Rc of the first capstan 14 so that the deceleration rate Rs and the deceleration rate ratio Rc/Rs satisfy Equation (2) described above. In this way, the deceleration rate Rc of the first capstan 14 is set in accordance with the deceleration rate Rs of the feeding bobbin 12.

Next, the CPU 702 outputs a stop instruction signal to the driver 724 via the output unit 714. The driver 724 to which the stop instruction signal is input from the CPU 702 outputs a stop signal to the servomotor 54. In response to the stop signal being input from the driver 724 to the servomotor 54, stop of rotary drive of the servomotor 54 is instructed (step S18).

Furthermore, the CPU 702 outputs the stop instruction signal to the driver 724 as described above and outputs a deceleration rate setting instruction signal. The deceleration rate setting instruction signal is a control signal for instruction to set a deceleration rate of the first capstan 14 to a deceleration rate calculated based on the deceleration rate of the feeding bobbin 12 in step S16.

The driver 724 to which the deceleration rate setting instruction signal is input from the CPU 702 outputs a deceleration rate setting signal to the servomotor 54. Setting is such that, with the deceleration rate setting signal being input from the driver 724 to the servomotor 54, the rotation of the servomotor 54 slows down at a constant rate. Thereby, the deceleration rate calculated in step S17 is set for the first capstan 14 whose rotation is stopped (step S19).

The first capstan 14 slows down at the deceleration rate set as described above and then stops the rotation (step S20).

After the rotation of the first capstan 14 stops, the rotation of the feeding bobbin 12 stops (step S21).

In such a way, when disconnection of the optical fiber 10 occurs, the feeding bobbin 12 and the first capstan 14 are controlled by the control unit 70 so as to stop the rotation of the feeding bobbin 12 and the rotation of the first capstan 14. Note that the control unit 70 also controls the second capstan 18 and the winding bobbin 20 so as to stop the rotation of the second capstan 18 and the rotation of the winding bobbin 20.

As discussed above, according to the present embodiment, in the control of stopping transportation of the optical fiber 10 in response to occurrence of disconnection of the optical fiber 10, the deceleration rate of the first capstan is set in accordance with the deceleration rate of the feeding bobbin 12. Thereby, occurrence of a fiber-strike on the feeding bobbin 12 side can be suppressed or prevented regardless of the weight of the feeding bobbin 12. Further, since the present embodiment does not require additional member, component, structure, or the like other than the control unit 70 for setting the deceleration rate of the first capstan 14 as described above, suppression or prevention of occurrence of a fiber-strike can be realized with a low cost.

Second Embodiment

Figure 8:
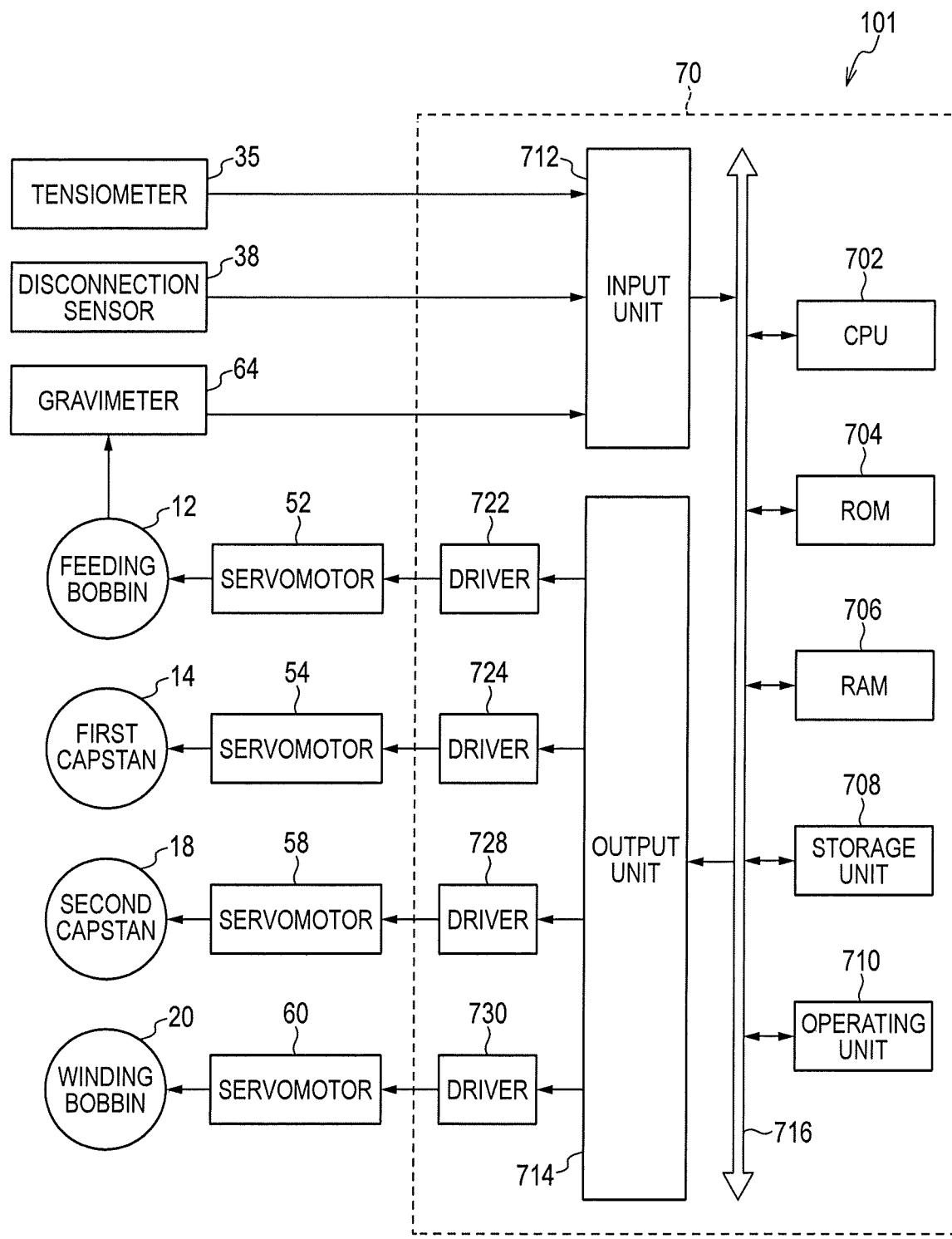
FIG. 8 is a block diagram illustrating a screening apparatus for an optical fiber according to a second embodiment of the present invention.

A screening apparatus for an optical fiber and a screening method for an optical fiber according to a second embodiment for the present invention will be described by using FIG. 8. FIG. 8 is a block diagram illustrating the screening apparatus for an optical fiber according to the present embodiment. Note that the same components as those in the screening apparatus for an optical fiber and the screening method for an optical fiber according to the first embodiment described above are labeled with the same reference numerals, and the description thereof will be omitted or simplified.

While the case where the deceleration rate of the feeding bobbin 12 is calculated based on the rotation number of the feeding bobbin 12 measured by the rotation number counter 62 has been described in the first embodiment described above, the deceleration rate of the feeding bobbin 12 can be calculated based on other measurement values.

The basic configuration of the screening apparatus for an optical fiber according to the present embodiment is substantially the same as the configuration of the screening apparatus 1 for the optical fiber according to the first embodiment. The screening apparatus for the optical fiber according to the present embodiment is different from the screening apparatus for the optical fiber according to the first embodiment in that it has a gravimeter that measures the weight of the feeding bobbin 12 instead of the rotation number counter 62 that measures the rotation number of the feeding bobbin 12.

As illustrated in FIG. 8, in a screening apparatus 101 for an optical fiber according to the present embodiment, a gravimeter 64 that measures the weight of the feeding bobbin 12 is provided instead of the rotation number counter 62. A load cell is used as the gravimeter 64, for example.

The gravimeter 64 provided in the feeding bobbin 12 measures the weight of the feeding bobbin 12 and outputs a measurement signal in accordance with the measured weight while a screening test is being performed. The measurement signal output from the gravimeter 64 is input to the CPU 702 via the input unit 712.

The CPU 702 acquires the weight of the optical fiber 10 left wound around the feeding bobbin 12 when stop of the rotary drive of the servomotor 52 is instructed, that is, the remaining weight of the optical fiber 10 based on the measurement signal input from the gravimeter 64.

Furthermore, the CPU 702 refers to the database stored in the storage unit 708 and calculates the deceleration rate of the feeding bobbin 12 based on the acquired remaining weight of the optical fiber 10.

In the storage unit 708, a correlation between the remaining weight of the optical fiber 10 and the deceleration rate of the feeding bobbin 12 is acquired in advance and stored as a database. By referring to this database, the CPU 702 calculates the deceleration rate of the feeding bobbin 12 based on the calculated remaining weight of the optical fiber 10.

As discussed in the present embodiment, the remaining weight of the optical fiber 10 may be acquired by using the gravimeter 64 to measure the weight of the feeding bobbin 12, and the deceleration rate of the feeding bobbin 12 may be calculated based on the remaining weight of the optical fiber 10.

OTHER EMBODIMENTS

The control unit 70 of the screening apparatus 1 or 101 according to the embodiments described above can be implemented based on a control program that is a computer program executed by a processor such as a CPU of a programmable logic controller and other computer devices. Such a control program can be created as a program that causes a processor of a computer device to execute steps implementing each operation and each process described in the above embodiments. A part or whole of the control program can be provided by a computer readable storage medium which stores the part of whole of the control program. Such a storage medium may be, for example, a digital versatile disc-read only memory (DVD-ROM), a compact disc-read only memory (CD-ROM), Universal Serial Bus (USB) memory, other flash memory, or the like. Further, a part or whole of the control program can be provided via a network.

Modified Embodiment

The present invention is not limited to the embodiments described above, and various modifications are possible.

For example, while the apparatus configuration having a predetermined number of pulleys and dancers illustrated in FIG. 1 has been described as an example for the screening apparatus 1 in the above embodiments, the number of pulleys and the number of dancers are not limited to the case illustrated in FIG. 1. The number of pulleys and the number of dancers can be changed as appropriate.

Further, in the above embodiments, the case where the servomotors 52, 54, 58, and 60 are used as motors that rotary-drive the feeding bobbin 12, the first capstan 14, the second capstan 18, and the winding bobbin 20 has been described as an example. However, the motors that rotary-drive the feeding bobbin 12, the first capstan 14, the second capstan 18, and the winding bobbin 20 are not limited to a servomotor, and various motors can be used.

Further, while the remaining length or the remaining weight of the optical fiber 10 is acquired when the deceleration rate of the feeding bobbin 12 is calculated in the embodiments described above, the remaining length or the remaining weight of the optical fiber 10 can be acquired by other methods than the above.

For example, a timer that measures elapsed time from a start of a screening test is provided, and the length of the optical fiber 10 fed out from the feeding bobbin 12 is calculated in accordance with the drawing speed of the transported optical fiber 10 and the elapsed time measured by the timer. Next, the remaining length of the optical fiber 10 is calculated in accordance with the length of the fed out optical fiber 10 and the length of the optical fiber initially wound around the feeding bobbin 12. Further, the weight per unit length of the optical fiber 10 can be used to convert the calculated remaining length of the optical fiber 10 into the remaining weight of the optical fiber 10.

Further, for example, by using a scale meter to measure the scale of the length of the optical fiber 10 fed out from the feeding bobbin 12, the remaining length of the optical fiber 10 can also be calculated in accordance with the length of the measured scale of the optical fiber 10 and the length of the optical fiber 10 initially wound around the feeding bobbin 12.

Further, while the case where a screening test is performed for the optical fiber 10 has been described as an example in the above embodiments, the present invention can be widely applied to screening tests that test a tensile strength performance of a linear member such as a wire, a cable, a power line, or the like other than an optical fiber.

LIST OF REFERENCE NUMERALS 1, 101: screening apparatus
10: optical fiber
12: feeding bobbin
14: first capstan
16: screening unit
18: second capstan
20: winding bobbin
62: rotation number counter
64: gravimeter
70: control unit

The invention claimed is:

1. A screening apparatus for an optical fiber, the screening apparatus comprising:
a feeding bobbin that feeds out an optical fiber;
a tension application unit that applies a tension to the optical fiber fed out from the feeding bobbin;
a capstan that feeds the optical fiber fed out from the feeding bobbin into the tension application unit;
a winding bobbin that winds the optical fiber to which the tension is applied by the tension application unit; and
a control unit that, when disconnection of the optical fiber occurs due to the tension applied by the tension application unit, controls the feeding bobbin and the capstan so as to stop rotation of the feeding bobbin and rotation of the capstan and sets a deceleration rate of the capstan in accordance with a deceleration rate of the feeding bobbin.

2. The screening apparatus for the optical fiber according to claim 1, wherein the control unit sets the deceleration rate of the capstan so that x and y satisfy following Equation (1):

$$4.1\times10^{-5}x+1.002 \le y < 8.3\times10^{-5}x+1.141 \quad (1),$$

where the deceleration rate of the feeding bobbin is x, and a ratio of the deceleration rate of the capstan to the deceleration rate of the feeding bobbin is y.

3. The screening apparatus for the optical fiber according to claim 2, wherein the control unit sets the deceleration rate of the capstan so that x and y satisfy following Equation (2):

$$0.9\times(6.2\times10^{-5}x+1.072) \le y \le 1.1\times(6.2\times10^{-5}x+1.072) \quad (2).$$

4. The screening apparatus for the optical fiber according to claim 1, wherein the control unit calculates the deceleration rate of the feeding bobbin based on a rotation number of the feeding bobbin.

5. The screening apparatus for the optical fiber according to claim 1, wherein the control unit calculates the deceleration rate of the feeding bobbin based on a weight of the feeding bobbin.

6. A screening method for an optical fiber, the screening method comprising steps of:
feeding out an optical fiber from a feeding bobbin;
feeding the optical fiber into a tension application unit by using a capstan;
applying a tension to the optical fiber by the tension application unit;
winding the optical fiber to which the tension is applied by the tension application unit by using a winding bobbin; and
when disconnection of the optical fiber occurs due to the tension applied by the tension application unit, stopping rotation of the feeding bobbin and rotation of the capstan and setting a deceleration rate of the capstan in accordance with a deceleration rate of the feeding bobbin.

7. The screening method for the optical fiber according to claim 6, wherein the deceleration rate of the capstan is set so that x and y satisfy following Equation (1):

$$4.1\times10^{-5}x+1.002 \le y < 8.3\times10^{-5}x+1.141 \quad (1),$$

where the deceleration rate of the feeding bobbin is x, and a ratio of the deceleration rate of the capstan to the deceleration rate of the feeding bobbin is y.

8. The screening method for the optical fiber according to claim 7, wherein the deceleration rate of the capstan is set so that x and y satisfy following Equation (2):

$$0.9\times(6.2\times10^{-5}x+1.072) \le y \le 1.1\times(6.2\times10^{-5}x+1.072) \quad (2).$$

9. The screening method for the optical fiber according to claim 6, wherein the deceleration rate of the feeding bobbin is calculated based on a rotation number of the feeding bobbin.

10. The screening method for the optical fiber according to claim 6, wherein the deceleration rate of the feeding bobbin is calculated based on a weight of the feeding bobbin.

* * * * *